United States Patent [19]
Duffy et al.

[11] Patent Number: 5,163,380
[45] Date of Patent: Nov. 17, 1992

[54] METHOD AND APPARATUS FOR ASSESSING METABOLIC BEHAVIORAL AND PHYSIOLOGICAL STATUS OF ANIMALS

[75] Inventors: Peter H. Duffy, Pine Bluff; Joseph F. Meehan, III; Ronald W. Hart, both of Little Rock, all of Ark.

[73] Assignee: United States of America, Washington, D.C.

[21] Appl. No.: 564,877

[22] Filed: Aug. 9, 1990

[51] Int. Cl.$^5$ .............................................. A01K 1/00
[52] U.S. Cl. ........................................ 119/15; 119/18; 119/54
[58] Field of Search ............... 119/15, 17, 18, 54, 119/56.1, 56.2, 57.1, 174; 222/58, 77

[56] References Cited

U.S. PATENT DOCUMENTS

| | | | |
|---|---|---|---|
| 2,699,752 | 1/1955 | Reyes | 119/18 |
| 3,229,311 | 7/1967 | Goff et al. | 222/58 |
| 3,303,823 | 2/1967 | Cohen | 222/77 X |
| 3,803,571 | 4/1974 | Luz | 119/15 |
| 3,919,977 | 11/1975 | Clark | 119/18 |
| 3,974,798 | 8/1976 | Mertze, Jr. | 119/15 |
| 4,357,903 | 11/1982 | Moss et al. | 119/15 |
| 4,416,218 | 11/1983 | Holz | 119/18 |
| 4,448,150 | 5/1984 | Catsimpoolas | 119/15 |
| 4,854,328 | 8/1989 | Pollack | 119/174 |

FOREIGN PATENT DOCUMENTS 0048132 4/1980 Japan ........................................ 222/58

Primary Examiner—Gene Mancene
Assistant Examiner—Todd E. Manahan
Attorney, Agent, or Firm—Cushman, Darby & Cushman

[57] ABSTRACT

Laboratory animals having known genetic, metabolic, and physiologic characteristics are maintained in sterile containment cells with known quantities of food, water, and oxygen provided to the animals and the rate of consumption monitored on a real- or near real-time basis. The containment cell, the food source, and the water source are mounted upon or suspended on or from load beams so that the mass of water and food consumed and the mass of the specimen are independently determinable on a real- or near real-time basis. The oxygen content of the input air is measured and at least the carbon dioxide and preferably both the oxygen and the carbon dioxide content of the output air are determined. A radio-frequency transducer is embedded within the specimen and transmits a short-range telemetry signal encoded with the specimen heart rate, body temperature, and blood pressure to a set of spaced antennas connected to a data receiver. The relative received-signal strengths from the various antennas determines the position of the specimen in its containment cell and the rate of change of the position of the specimen with time to provide an indication of the motor activity of the specimen and the caloric energy expended by the specimen during the period of activity.

31 Claims, 8 Drawing Sheets

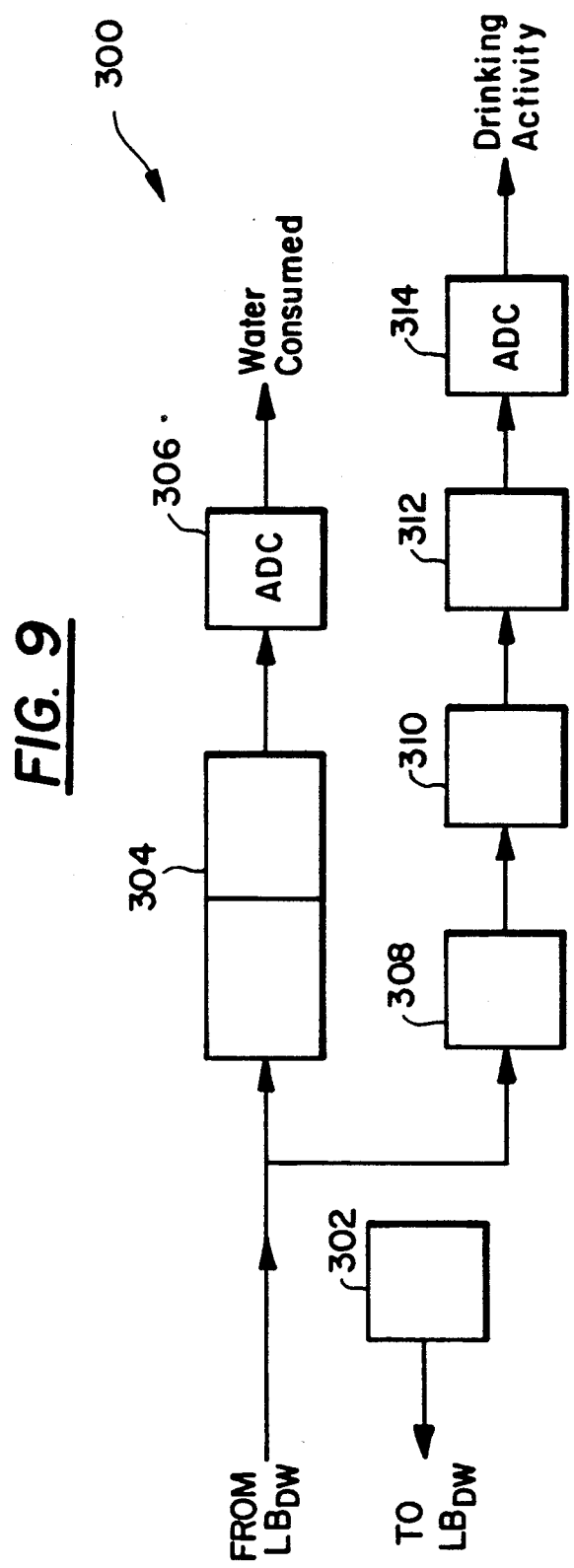

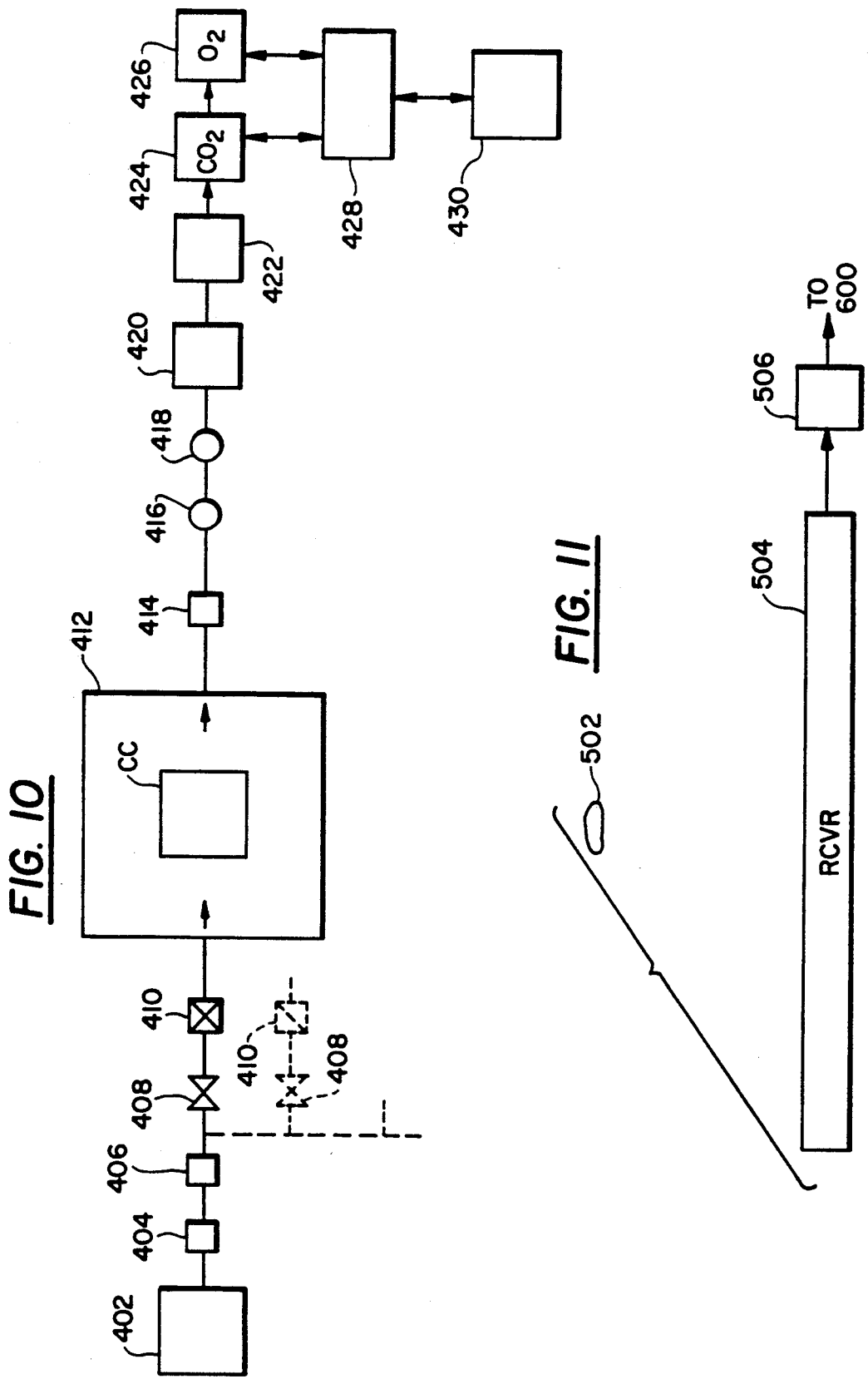

METHOD AND APPARATUS FOR ASSESSING METABOLIC BEHAVIORAL AND PHYSIOLOGICAL STATUS OF ANIMALS

BACKGROUND OF THE INVENTION

The present invention relates to a method and apparatus for assessing metabolic, behavioral, and physiological status of living specimens and, more particularly, to methods and systems for assessing multi-dimensional physiologic responses and effects of various environmental conditions and pharmacologically active substances on living specimens.

Various systems have been developed for assessing the physiologic, metabolic, and behavioral responses of living organisms, particularly laboratory animals, to various changes in their environment and to the introduction of pharmacologically active substances, including toxins and carcinogens, into their systems. Conventional protocols are directed to detecting changes in the metabolic, physiological, and behavioral characteristics of one or a few parameters in a living organism to the introduction of an environmental change and/or pharmacologically active substances. For example, a set of laboratory animals, such as mice or rats having known physiologic, genetic, and metabolic characteristics, are divided into at least two subsets with one subset functioning as a control group and another subset functioning as the test group. Both groups are provided with identical environments with a pharmacologically active substance introduced into the test group and one or more response parameters measured. Thereafter, a comparison of the responses between the control group and those of the test group provides a basis for assessing the effect of the introduced substance. In general, laboratory protocols of this type are adequate for providing information as to one or a few independent or dependent variables. Where a large number of interrelated variables must be evaluated on a real-time or near real-time basis, existing sensing and information gathering systems are inadequate.

SUMMARY OF THE INVENTION

In view of the above, it is an object of the present invention, among others, to provide a method and apparatus for assessing a large number of interrelated variables related to metabolic, behavioral, and physiological of living organisms in response to changes in their environment.

It is another object of the present invention to provide a method and apparatus for assessing a large number of interrelated variables related to metabolic, behavioral, and physiological of living organisms in response to the introduction of pharmacologically active substances into their systems.

It is still another object of the present invention to provide a method and apparatus for assessing a large number of interrelated variables related to metabolic, behavioral and physiological of living organisms in response to the introduction of pharmacologically active substances and changes in environmental conditions.

In view of these objects, and others, the present invention provides a method and apparatus for assessing metabolic, physiologic, and behavioral characteristics of living organisms by which organisms of known genetic, physiologic, and metabolic characteristics are maintained in a closed environmental system in which all environmental factors and the supply of all metabolic substrates supplied to the organisms and all resultant output energies are monitored on a continuous real-time basis to obtain baseline data for a large number of related parameters. A physiologically active agent, such as a pharmaceutical, a carcinogen, or a toxin, is provided to the living organism for metabolization and the resultant response, including metabolized materials and resultant energies, are monitored and compared to the baseline data to determine the multi-variable physiologic response.

In the preferred embodiment, germ-free laboratory mice and/or rats having known genetic, metabolic, and physiologic characteristics are maintained in sterile containment cells. Food, water, and oxygen are provided to the specimens and the rate of consumption monitored on a real- or near real-time basis. More specifically, the containment cell, the food source, and the water source are mounted upon or suspended on or from load beams so that the mass of water and food consumed and the mass of the specimen are independently determinable on a real- or near real-time basis. The various load beams provide signal outputs in response to the specimen moving about its containment cell and the application of forces to the food and water sources in response to eating or drinking activity. Thus, any decrement in the quiescent signal output is related to changes in specimen weight or the weight of the food or water consumed by the specimen. Conversely, short-term variations in the signal output are representative of motor activity or feeding or drinking activity.

The oxygen content of the input air is measured and at least the carbon dioxide and preferably both the oxygen and the carbon dioxide content of the output air are determined. A radio-frequency transducer is embedded within the specimen and transmits a short-range telemetry signal encoded with the specimen heart rate, body temperature, and blood pressure to a set of spaced antennas connected to a data receiver.

At selected times in the life of the specimen, certain stimuli are introduced into the food, water, and/or input air stream and the short- and long-term response measured by the system. The stimuli can take the form of pharmacologically active agents, including pharmaceuticals, toxins, or carcinogens, in pre-selected dose amounts. In addition to the introduction of the stimuli, multi-dimensional environmental conditions, such as the time-of-day the stimuli is introduced, can be varied to determine, for example, the optimal time during the diurnal cycle for the introduction of the stimuli.

In accordance with one feature of the invention, signal processing channels intended for the measurement of parameters representative of the quiescent state of the specimen are provided with filtering circuits to separate the steady-state DC component from the AC component so that specimen-quiescent data can be separated from specimen-active data. The filtering also allows inhibiting measurement when the specimen is in an activity state above a selected activity threshold.

The present invention advantageously provides a method and apparatus for assessing metabolic behavioral physiological status of living specimens by providing various life support materials and an input material of interest (i.e., a toxin, carcinogen, pharmacologically active compound) and sensing various data to assay the effect of the introduced input material to provide short- and long-term physiological waveforms that indicate specific pathological, physiologic, or behavioral effects of the select input material.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 9 is a schematic block diagram of the specimen water consumption and drinking activity sub-system;

FIG. 10 is a schematic block diagram of the specimen gas analysis sub-system; and FIG. 11 is a schematic block diagram of the specimen telemetry sub-system.

DESCRIPTION OF THE PREFERRED EMBODIMENT

Figure 1:
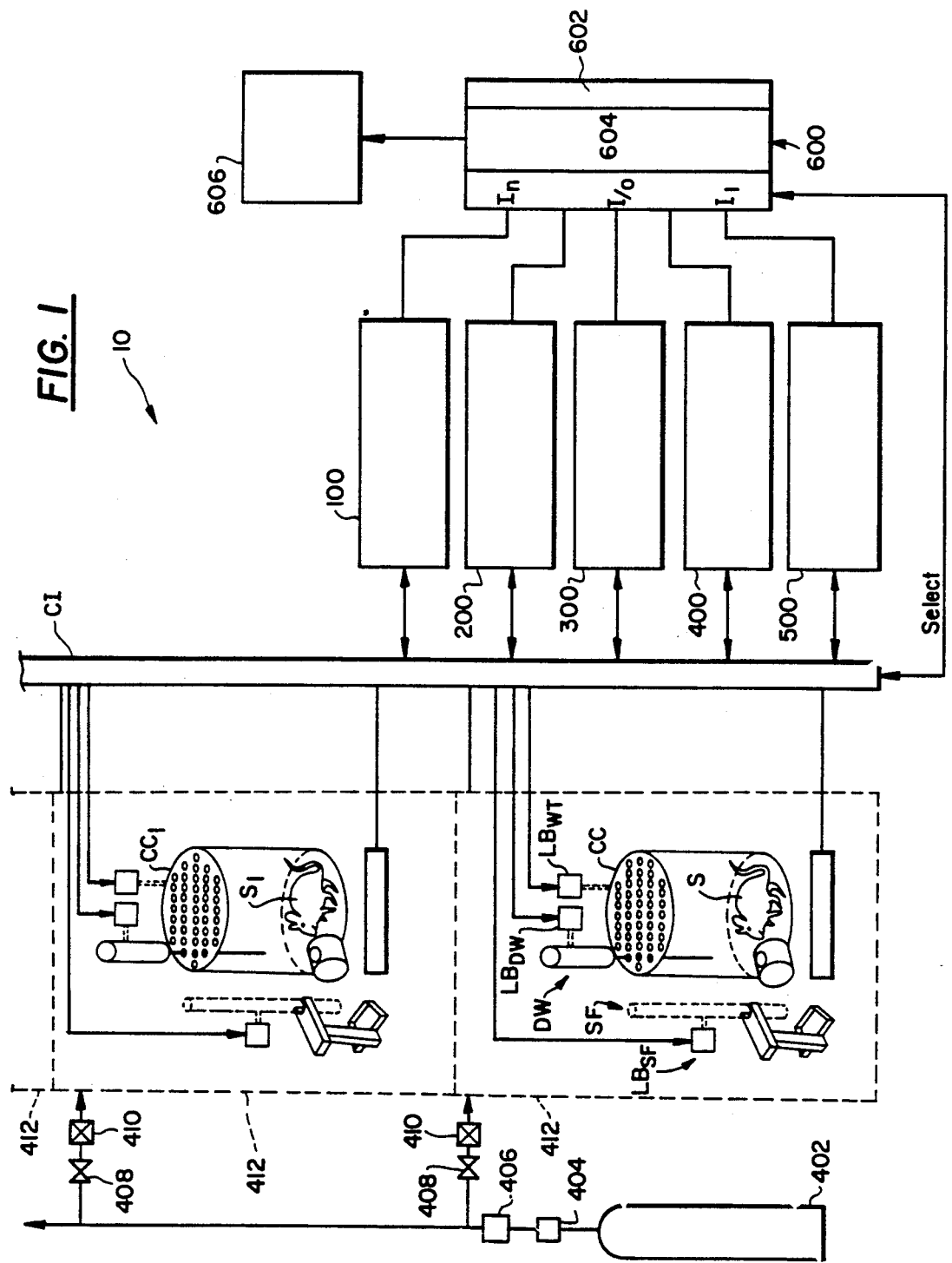
FIG. 1 is an overall schematic diagram of a system in accordance with the present invention and illustrates various constituent sub-systems.

A preferred embodiment of a system for assessing metabolic and behavior physiology of living specimens in accordance with the present invention is shown in FIG. 1 and designated generally therein by the reference character 10. As shown, the system 10 includes at least one containment cell, indicated generally at CC, for a living specimen S, such as a laboratory rat or mouse of known or determinable genetic, metabolic, and physiologic characteristics. As represented in the containment cell $CC_1$ and the specimen $S_1$, a plurality of containment cells $CC_1$, $CC_2$, . . . $CC_{n-1}$, $CC_n$, for a corresponding plurality of specimens $S_1$, $S_2$, . . . $S_{n-1}$, $S_n$ can be provided as desired. The containment cell CC is suspended from or otherwise supported by a load-beam $LB_{wt}$ for providing information as to the combined weight of the containment cell CC and the body weight of the specimen S. Since the initial weight of the containment cell CC is known, the load beam $LB_{wt}$ provides data as to the body weight of the specimen S and changes in that body weight over time. Additionally, the load beam $LB_{wt}$ will provide a proportional output in response to forces imparted to the structure of the containment cell CC as a consequence of the motor activity of the specimen S. As explained below, the motor activity episode information is functionally related to calories consumed and the metabolism of the specimen S. A solid food source SF is mounted in operative relationship to the containment cell CC and is supported by a load beam $LB_{sf}$ which monitors the quantity of solid food available to the specimen S over time and measures changes in that quantity as an indication of food consumption. Additionally, a drinking water source DW is mounted in an operative relationship to the containment cell CC and is likewise supported by a load beam $LB_{dw}$ to monitor the quantity of drinking water available to the specimen S over time and the changes in that quantity. As explained more fully below, both the solid food source and drinking water source, SF and DW, are mechanically decoupled from each other and also isolated from the structure of the containment cell CC so that changes in the weight of any one of the containment cell CC, the solid food source SF, and/or the drinking water source DW will not affect the output of the other load beams.

Various sub-systems are connected to or otherwise obtain data from the containment cell CC including a specimen body weight and motor activity sub-system, indicated generally at 100 in FIG. 1; a solid food consumption and feeding activity sub-system, indicated generally at 200; a water consumption and drinking activity sub-system indicated generally at 300; a gas analysis sub-system, indicated generally at 400; and a telemetry system indicated generally at 500. In addition, signal processing is provided in at least one of the sub-systems to identify the steady-state DC component of the sensed signal separately from the AC component so that signal variations from a quiescent value consequent to the physical activity of the specimen S will not adversely affect the veracity of the output data. The various containment cells $CC_n$ and electrical and fluidic pathways are connected to a connection interface CI that serves as a control and data multiplexer to route the sub-systems to a data logging and analysis system, indicated generally at 600, by which the processed outputs are stored and evaluated and various control signals are provided. The connection interface CI is under the control of the data logging and analysis system 600 and serves to successively connect the containment cells $CC_n$ thereto.

Figures 2, 3:
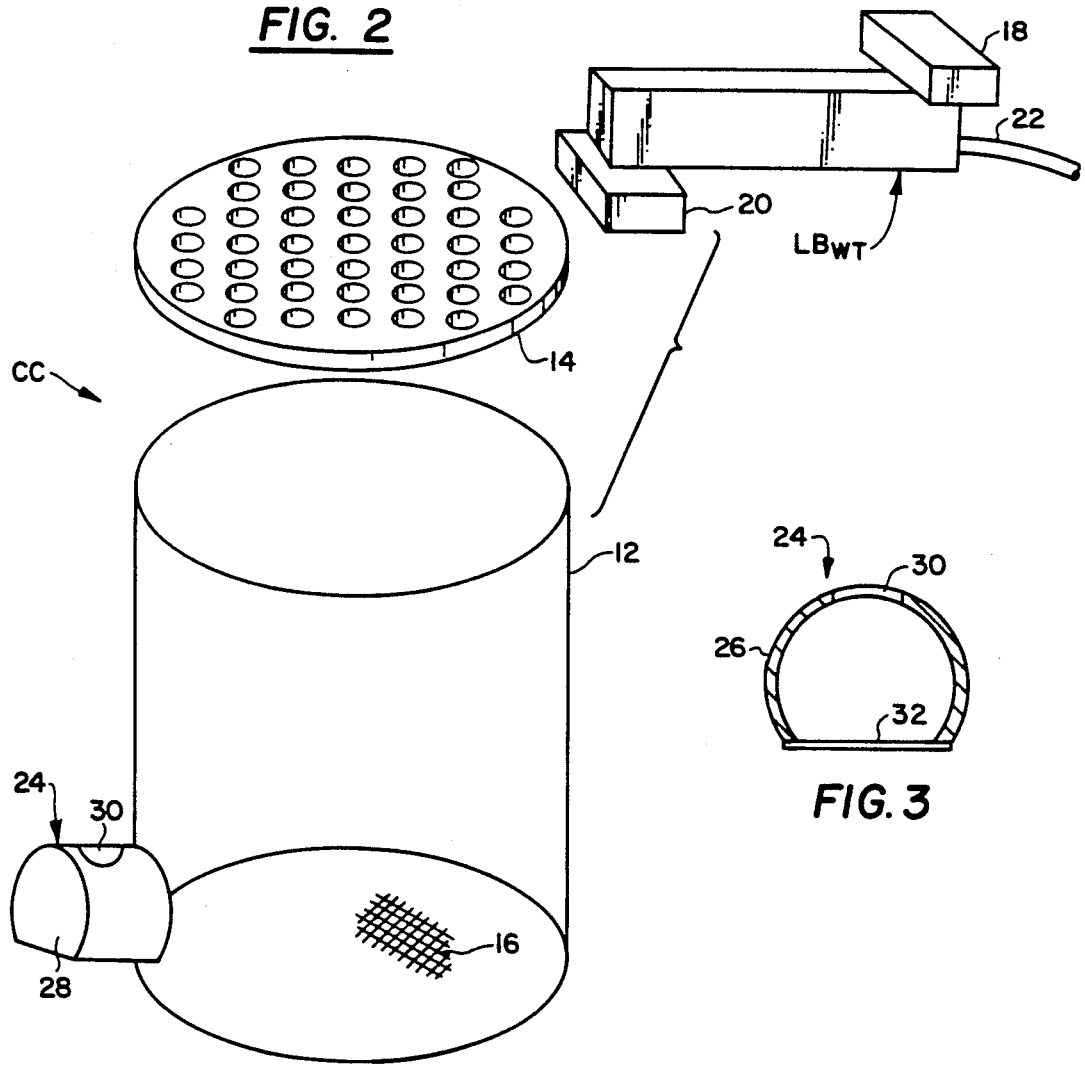
FIG. 2 is a perspective view of a load-beam suspended containment cell for housing a living specimen.
FIG. 3 is a detailed cross-sectional view of a food entry port of the containment cell shown in FIG. 2 taken along line 3—3 of FIG. 2.

A preferred containment cell CC is shown in exploded perspective in FIG. 2 and includes a cylindrical polycarbonate (i.e., LEXAN) wall 12. An apertured disc serves as the cover 14 and an open-mesh metal screen (only a portion of which is illustrated) serves as the floor 16. While not specifically shown, the cover 14 and the floor 16 are releasably secured to their respective ends of the wall 12. As explained below, a portion of the containment cell CC is preferably radio-frequency transparent since a telemetry transmitter is implanted in the specimen S.

The containment cell CC is suspended from a support member (not shown) by its load beam $LB_{wt}$ which measures the combined mass of the containment cell CC and the specimen S. In general, it is preferred that the containment cell CC be suspended below a support member although the load beam $LB_{wt}$ can support the containment cell CC from below. The load beam $LB_{wt}$ is of the cantilever-type in that its proximate end includes a flange 18 for attachment to a superposed supporting structure (not shown) and the remote end is attached by a similar flange 20 to the cover 14. An electrical cable 22 provides an input path for excitation power to the load beam $LB_{wt}$ and an output path for the electrical signal output. A food entry port, generally indicated at 24, is provided adjacent the floor 16 in a position readily accessible by the specimen S. As shown in FIG. 2 and in cross-section in FIG. 3, the food entry port 24 is configured as a cylinder 26 closed at its remote end by an end wall 28 and having an opening 30 on its upper side and a flat open mesh screen 32 on its lower side aligned along a chordal line. The food entry port 24 is aligned with an opening (unnumbered) in the wall 12 and affixed to the wall 12 using a suitable cement or adhesive. As explained below, the specimen S can insert the forward end of its head into the food entry port 24 to obtain food made available by the solid food source SF.

Figure 4:
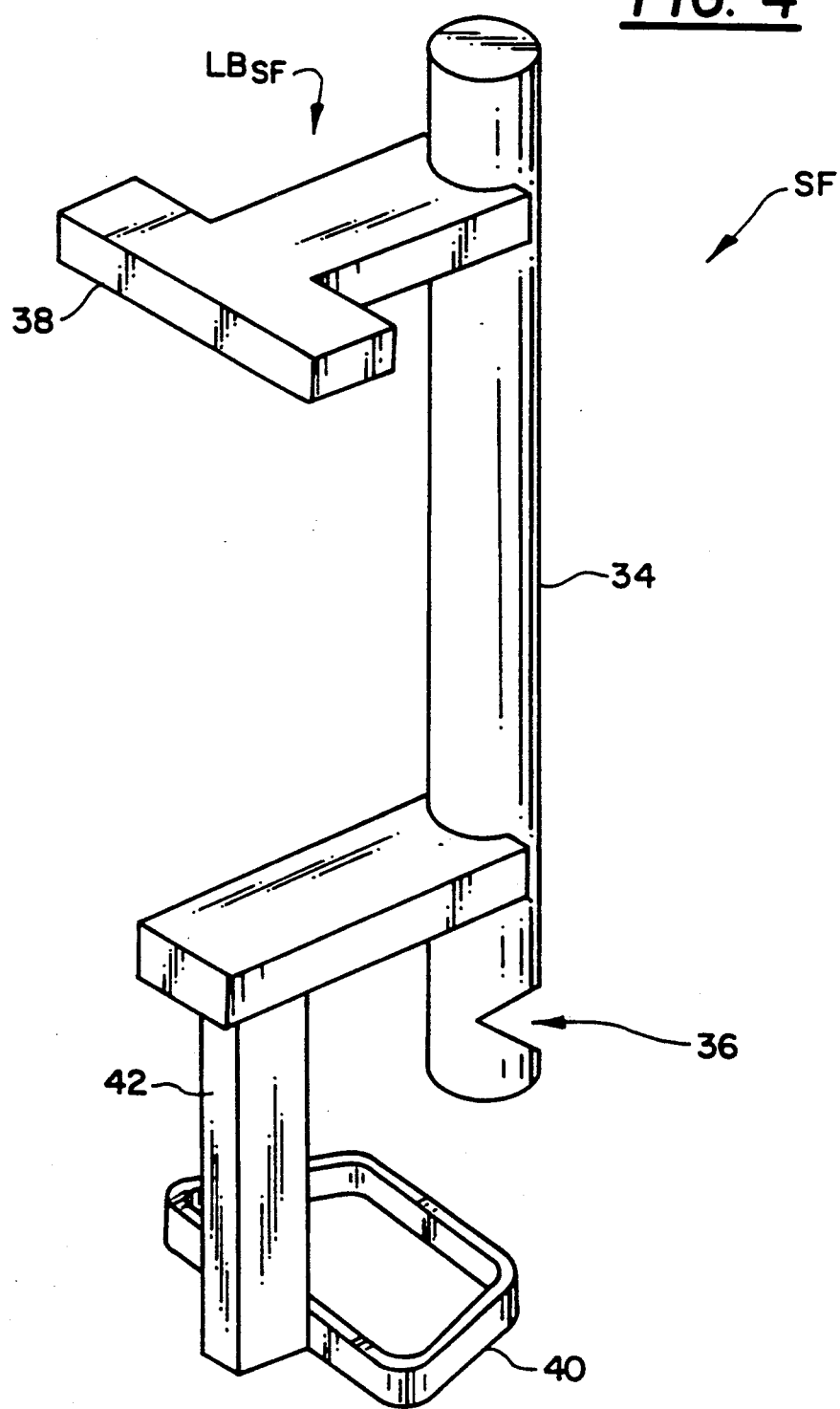
FIG. 4 is a detailed view of the load-beam supported solid food source of FIG. 2.
Figure 5:
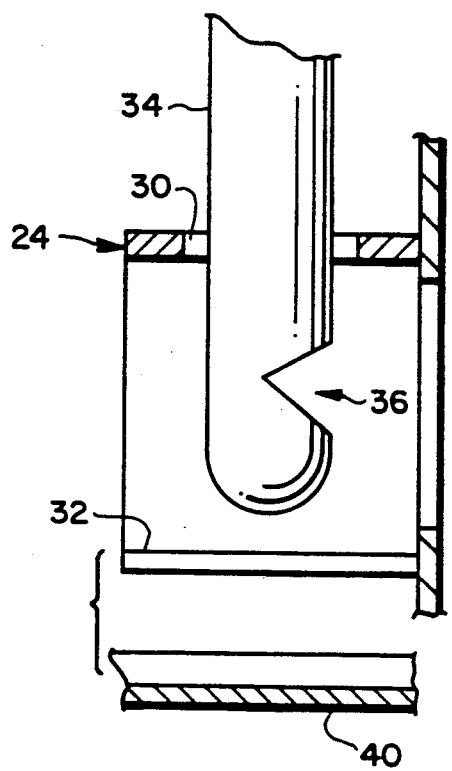
FIG. 5 is a detailed view of the mounted interrelationship between the solid food source of FIG. 4 and the food entry port of the containment cell shown in FIG. 3.

As shown in FIG. 4, the solid food source SF includes a vertically aligned feeding tube 34 designed to hold a supply of food pellets (not shown) suitable for consumption by the specimen S. A cleft-like pellet-access opening 36 is provided in the lower end of the feeding tube 34 to present successive food pellets to the specimen S. In general, the opening 36 is sufficiently large to allow adequate access to the food pellet by the specimen but not large enough to allow the specimen S to withdraw a food pellet from the feeding tube 34. The load beam $LB_{sf}$ is connected at its upper end to a fixture (unnumbered) that carries the feeding tube 34 and includes a flange 38 at its proximate end for connection to a mounting structure. A catch pan 40 is positioned beneath the lower end of the feeding tube 34 and maintained in that position by a depending support arm 42. As shown in the detail view of FIG. 5, the solid food source SF is positioned so that the lower end of the feeding tube 34 extends through the opening 30 into the entry port 24 with the pellet-access opening 36 facing the interior of the containment cell CC. The catch pan 40 is supported below the entry port 24 so that food particles not consumed by the specimen S fall through the screen 32 onto the catch pan 40. The mounting of the solid food source SF is such that the solid food source SF does not touch and is mechanically isolated from the entry port 24 and the containment cell CC. Thus, the lowermost end of the feeding tube 34 is spaced from the screen 32 and the opening 30 is sufficiently large to provide a clearance space surrounding the lower portion of the feeding tube 34.

Since the load beam $LB_{sf}$ will sense both the weight of the food pellets in the feeding tube 34 and any unconsumed particles in the catch pan 40, the load beam $LB_{sf}$ will provide accurate data as to food actually consumed by the specimen S. As can be appreciated, the load beam $LB_{sf}$ will also provide variations in its output in response to the lower end of the feeding tube 34 being urged in one direction or the other while the specimen S is feeding. The decrement in quiescent weight of the load beam $LB_{sf}$ is related to the solid food consumed by the specimen while short-term variations in the output of the load beam $LB_{sf}$ will be representative of feeding activity. Thus, the solid food consumed, the time duration of any eating episode, and the frequency of those episodes can be determined from the output of the load beam $LB_{sf}$. A suitable load beam LBsf is the Model 434376 Alpha Load Beam available from BLH, Inc., Canton, Mass. 02021.

Figure 6:
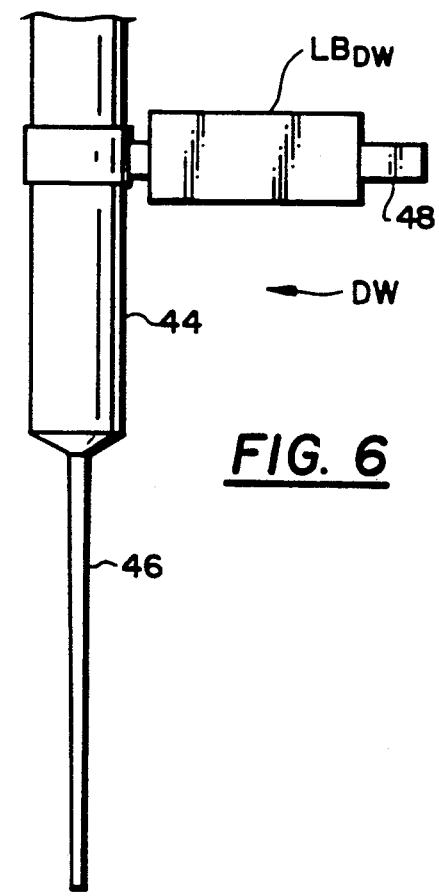
FIG. 6 is a detailed view of the load-beam supported drinking water source.

The drinking water source DW is illustrated in FIG. 6 and includes a water reservoir 44 and a depending supply tube 46. The drinking water source DW is supported at its upper end by the load beam $LB_{dw}$ which has a flange 48 at its proximate end to connect the drinking water source DW to a supporting structure. The lower end of the supply tube 46 includes a valving member (not shown) in the form of a tongue operated, pin-like stylus which normally seals the lower, outlet end of the supply tube 46 and which, when displaced upwardly by the specimen S, unseals the lower end of the supply tube 46 to supply drinking water to the specimen S. An air vent (not shown) is provided at the top end of the reservoir 44 to admit ambient air as the water is consumed but nonetheless prevents or otherwise limits the loss of water by evaporation. The drinking water source DW is suspended in the containment cell CC by the load beam $LB_{dw}$ so that the supply tube 46 passes through one of the apertures in the cover 14 with the bottom end of the supply tube 46 accessible to the specimen. As in the case of the solid food source SF, the drinking water source DW is positioned in such a way that it is mechanically isolated from the structure of the containment cell CC.

The load beam $LB_{dw}$ will provide accurate data as to water actually consumed by the specimen S, and, as in the case of the load beam $LB_{sf}$, the load beam $LB_{dw}$ will also provide variations in its output in response to the lower end of the supply tube 46 being urged in one direction or the other while the specimen S is drinking. The decrement in quiescent weight of the load beam $LB_{dw}$ is related to the water consumed by the specimen S while short-term variations in the output of the load beam $LB_{dw}$ will be representative of drinking activity. Thus, the drinking water consumed, the time duration of any drinking episode, and the frequency of those episodes can be determined from the output of the load beam $LB_{dw}$. A suitable load beam $LB_{dw}$ is the Model 1030F2 off-center weight cell available from TEDEA, Inc., Northridge, Calif. 91324.

Figure 7:
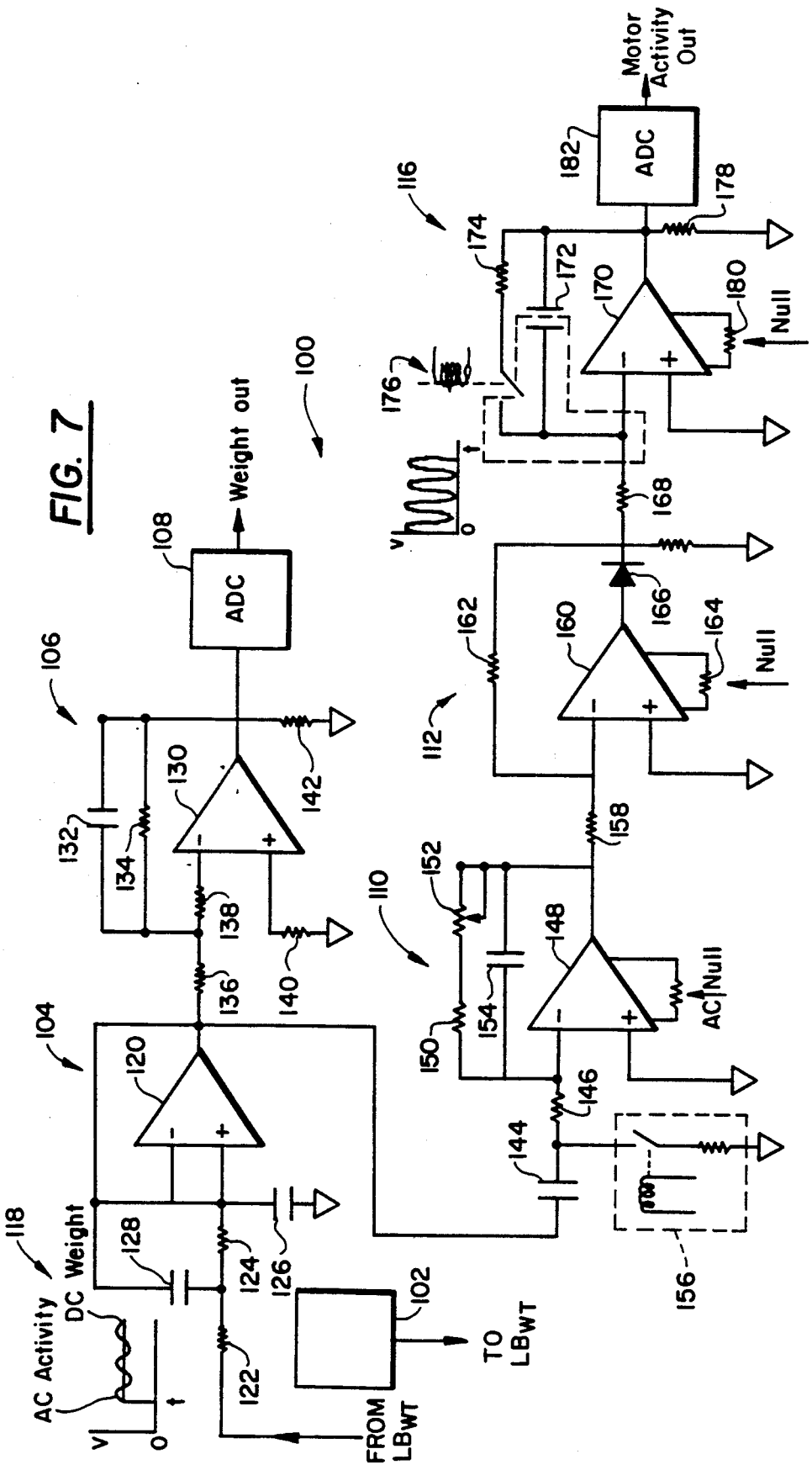
FIG. 7 is a combined schematic block and circuit diagram of a body weight and motor activity sub-system illustrating a low-pass filter system for separating the DC component of the output signal from the AC component.

The body weight and motor activity sub-system 100 is shown in a combined block and circuit diagram form in FIG. 7. As shown, the sub-system 100 includes an excitation power source 102 that provides excitation power to the load beam $LB_{wt}$ (not shown in FIG. 7) with the electrical output from the load beam $LB_{wt}$ provided to the input to a low-pass filter 104 which functions to separate the DC component from the AC component of the input signal and provide a measure of forward gain. The output of the low-pass filter 104 is connected to an averaging or integrating filter 106 which provides its output to an analog-to-digital converter 108 that provides its weight output to the data logging and analysis system 600 (FIG. 1) via the connection interface CI. The output of the low-pass filter 104 is also connected to an AC amplifier 110 and a signal processing path that includes an absolute value circuit 112 and an integrator 116 to provide an indication of the motor activity of the specimen S to the data logging and analysis system 600 via the connection interface CI (FIG. 1).

As shown by the voltage/time graph 118 in the upper left of FIG. 7, the signal output of the load beam $LB_{wt}$ includes a steady-state DC component that is representative of the total weight of the containment cell CC and the specimen S and a superimposed AC component that is representative of the motor activity of the specimen S as a consequence of the specimen S moving about the containment cell CC. When the specimen S is quiescent, the AC component will be essentially zero and long-term changes in the DC component will be indicative of changes in the body weight of the specimen S. Since, as described above, the solid food source SF and the drinking water source DW are mechanically isolated from the structure of the containment cell CC, variations in output of the load beam $LB_{wt}$ cause by movement of the specimen about the containment cell CC will have no effect on the output of the solid food source SF and the drinking water source DW, and, conversely, any variations in the output of these latter two sources will not directly affect the output of the load beam $LB_{wt}$.

The low-pass filter 104 is configured from an operational amplifier 120 with a low-pass RC input network connected to the non-inverting input. The RC input is defined by series-connected resistors 122 and 124 connected to the non-inverting input of the operational amplifier 120 and a capacitor 126 connected between the non-inverting input and local ground. A capacitor 128 is connected between the output of the operational amplifier 120 and the junction between the resistors 122 and 124 to define a Sallen-Key second order low-pass filter. In the preferred embodiment, the low-pass filter has a cut-off frequency $\omega_c$ of about 10 Hz; as can be appreciated the cut-off frequency $\omega_c$ value can be varied for different specimen species and other types of filters can be used to perform the equivalent function. Suitable values for the active components of the low-pass filter 104 are 150KΩ for resistors 122 and 124 and 0.047 $\mu f$ and 0.1 $\mu f$ for capacitors 126 and 128.

The output of the low-pass filter 104 is provided to the integrator 106 which is configured from an operational amplifier 130 having a capacitor 132 and a parallel-connected shunt resistor 134 connected in its feedback path to provide an integrator having a time period of about 20 seconds. Series-connected resistors 136 and 138 connect the output of the low-pass filter 104 to the inverting input of the operational amplifier 130 with the non-inverting input and the output connected to local ground through resistors 140 and 142, respectively, to control the forward gain of the operational amplifier 130 as is known. The output of the operational amplifier 130 is provided to the analog-to-digital converter 108, which, in turn, provides a multi-bit digital indication of the combined weight of the specimen S and its containment cell CC to the data logging and analysis system 600 via the connection interface CI. Suitable values for the active components of the integrating filter 106 are 1.0 $\mu f$ for capacitor 132 and 20MΩ for resistors 136 and 140, 10KΩ for resistors 138 and 142, and 20KΩ for resistor 134.

The output of the low-pass filter 104 is also provided to the AC amplifier 110 through a coupling capacitor 144 and a resistor 146 to the inverting input of an operational amplifier 148, the amplifier 148 including a feedback path defined by series-connected fixed resistor 150 and adjustable gain-control resistor 152 and a parallel-connected capacitor 154. A zero-check circuit 156 selectively operates a relay (unnumbered) through a resistor (unnumbered) to allow adjustment for offsets. Suitable values for the feedback path include 4MΩ and 2MΩ for resistors 150 and 152, 100KΩ for resistor 146, and 10 $\mu f$ and 1000 pf for capacitors 144 and 154.

The output of the AC amplifier 110 is provided through a coupling resistor 158 to the inverting input of the operational amplifier 160 that defines the absolute value circuit 112. A resistor 162 provides gain control and an adjustable resistor 164 provides absolute value null control. The output of the operational amplifier 160 is provided through a rectifying diode 166. The rectified output of the diode 166, representing the absolute value of the AC input coupled through capacitor 144, is provided through a resistor 168 to the inverting input of an operational amplifier 170 that defines the charge integrator 116. The operational amplifier 170 includes a capacitor 172 (0.5 $\mu f$) in its feedback path to effect charge integration. A resistor 174 is selectively shunted across the capacitor 172 to reset the integrator 116 by a relay, generally indicated at 176. A resistor 178 scales the output of the operational amplifier 170 and an adjustable resistor 180 effects null set. The analog output of the charge integrator 116 is representative of the motor activity of the specimen S. As in the case of the quiescent body weight value provided through the analog-to-digital converter 108, the analog output of the charge integrator 116 is provided to another analog-to-digital converter 182 which, in turn, provides a digital signal to the data logging and analysis system 600 via the connection interface CI.

While various types of operational amplifiers can be used in the circuits described above, CA3240 and CA3140's are suitable with CA3140's preferred for the charge integrator circuit; a suitable source is the RCA Solid State Division, Somerville, N.J. 08876.

Figure 8:
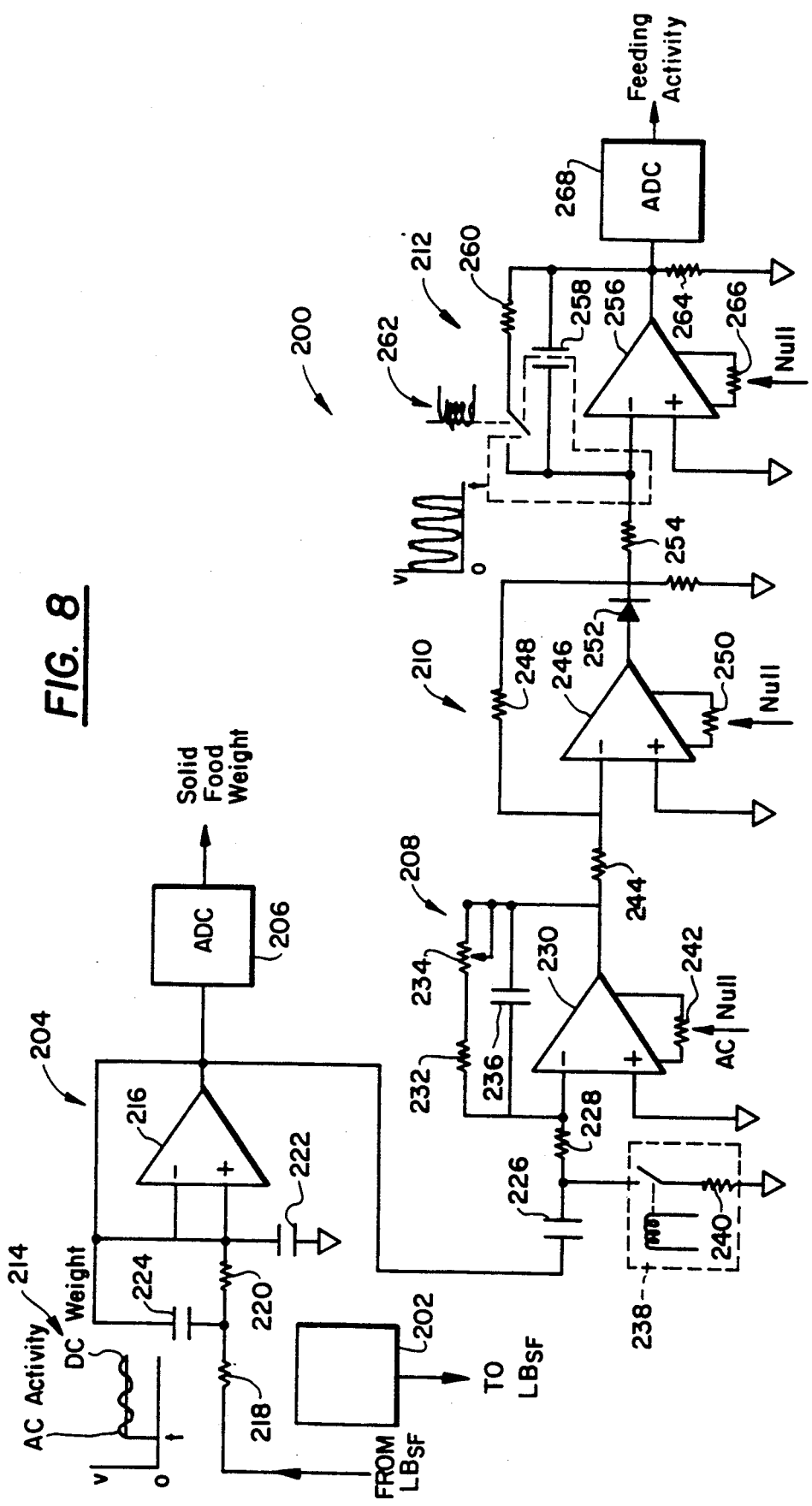
FIG. 8 is a combined schematic block and circuit diagram of a solid food consumption and feeding activity sub-system illustrating a low-pass filter system for separating the DC component of the output signal from the AC component.

The food consumption and feeding activity sub-system 200 is shown in a combined block and circuit diagram form in FIG. 8. As shown, the sub-system 200 includes an excitation power source 202 that provides excitation power to the load beam $LB_{sf}$ (not shown in FIG. 8) with the electrical output from the load beam $LB_{sf}$ provided to the input to a low-pass filter 204 which functions to separate the DC component from the AC component of the input signal and provide a measure of forward gain. The output of the low-pass filter 204 which provides an analog output directly related to food consumption and is connected to an analog-to-digital converter 206 that provides its solid food weight output to the data logging and analysis system 600 (FIG. 1) via the connection interface. The output of the low-pass filter 204 is also connected to an AC amplifier 208 and a signal processing path that includes an absolute value circuit 210 and an integrator 212 to provide an indication of the feeding activity of the specimen S to the data logging and analysis system 600 (FIG. 1).

As shown by the voltage/time graph 214 in the upper left of FIG. 8, the signal output of the load beam $LB_{sf}$ includes a steady-state DC component that is representative of the total weight of the solid food source SF and a superimposed AC component that is representative of the feeding activity of the specimen S as a consequence of the specimen S urging the lower end of the feeding tube 34 in one direction or the other while eating. When the specimen S is quiescent, the AC component will be essentially zero and long-term changes in the DC component will be indicative of the decrement of the solid food pellets in the feeding tube 34.

The low-pass filter 204 is configured from an operational amplifier 216 with a low-pass RC input network connected to the non-inverting input. The RC input is defined by series-connected resistors 218 and 220 Connected to the non-inverting input of the operational amplifier 216 and a capacitor 222 connected between the non-inverting input and local ground. A capacitor 224 is connected between the output of the operational amplifier 216 and the junction between the resistors 218 and 220 to define a Sallen-Key second order low-pass filter. In the preferred embodiment, the low-pass filter has a cut-off frequency $\omega_c$ of about 10 Hz; as can be appreciated this value can be varied for different specimen species and other types of filter can be used to perform the equivalent function.

The output of the low-pass filter 204 is provided to both the analog-to-digital converter 206 and to the AC amplifier 208 through a coupling capacitor 226 and a resistor 228 to the inverting input of an operational amplifier 230, the amplifier 230 including a feedback path defined by a series-connected fixed resistor 232 and adjustable gain-control resistor 234 and a parallel-connected capacitor 236. A zero-check circuit, including a relay 238 and a shunting resistor 240, selectively shunts the input of the AC amplifier 110 to ground to allow adjustment for offsets. An adjustable resistor 242 effects null adjustment.

The output of the AC amplifier 208 is provided through a coupling resistor 244 to the inverting input of an operational amplifier 246 that defines the absolute value circuit 210. A resistor 248 provides gain control and an adjustable resistor 250 provides absolute value null control. The output of the operational amplifier 246 is provided through a rectifying diode 252. The rectified output of the diode 252, representing the absolute value of the AC input coupled through capacitor 226, is provided through a resistor 254 to the inverting input of an operational amplifier 256 that defines the charge integrator 212. The operational amplifier 256 includes a capacitor 258 in its feedback path to effect charge integration. A resistor 260 is selectively shunted across the capacitor 258 to reset the integrator 212 by a relay, generally indicated at 262. A resistor 264 scales the output of the operational amplifier 256 and an adjustable resistor 266 effects null set. The analog output of the charge integrator 212 is representative of the feeding activity of the specimen S. As in the case of the solid food consumption data through the analog-to-digital converter 206, the analog output of the charge integrator 212 is provided to another analog-to-digital converter 268 which, in turn, provides a digital signal to the data logging and analysis system 600.

The water consumption and drinking activity sub-system 300 is shown in schematic block diagram form in FIG. 9. As shown, the sub-system 300 includes a excitation power source 302 that provides excitation power to the load beam $LB_{dw}$ (not shown in FIG. 9) with the electrical output from the load beam $LB_{dw}$ provided to the input to a combined low-pass filter and averaging circuit 304 which functions to separate the DC component from the AC component of the input signal and provide a measure of forward gain. The output of the low-pass filter 304, which provides an analog output directly related to the water consumed, is connected to an analog-to-digital converter 306 that provides its drinking water weight output to the data logging and analysis system 600 via the connection interface (FIG. 1). The output of the low-pass filter 304 is also connected to an AC amplifier 308 and a signal processing path that includes an absolute value circuit 310 and a charge integrator 312. The output of the charge integrator 312 is provided to an analog-to-digital converter 314 which provides a digital indication of the drinking episodes of the specimen S to the data logging and analysis system 600 (FIG. 1). The specific circuit details of the water consumption and drinking activity sub-system 300 are not shown in FIG. 9, the circuit details being substantially the same as that described above for the food consumption and feeding activity sub-system 200 shown in FIG. 8.

The gas analysis sub-system 400 is shown in schematic form in FIGS. 1 and 10 and is designed to provide standard air of known components to the specimen S and analyze the output for $CO_2$ and $O_2$ content to monitor metabolism. As shown in FIG. 10, a standard air source 402, having predetermined constituents, is directed through an inlet valve 404 and associated conduits (unnumbered) to a water trap 406 where moisture is removed and then through a flow valve 408 and a flow meter 410 to a chamber 412 which contains the containment cell CC and its specimen S. The flow valve 408 and the flow meter 410 are both connected (not specifically shown) to the data logging and analysis system 600 for selective control of the flow valve 408 and the input of gas flow data from the flow meter 410. The chamber 412 is configured so that only the standard air from the source 402 is available to the specimen S. The air output from the chamber 412 is passed via conduits (unnumbered) through another water trap 414 to a 2-way valve 416 and a 3-way valve 418 to a filter 420 and an air flow reduction bypass 422 to a conventional $CO_2$ analyzer 424 and an $O_2$ analyzer 426. The gas outputs of $CO_2$ analyzer 424 and the $O_2$ analyzer 426 are provided to an exhaust to ambient atmosphere. The $CO_2$ analyzer 424 and the $O_2$ analyzer 426 are under the control of control electronics 428 with the electrical outputs of the $CO_2$ analyzer 424 and the $O_2$ analyzer 426 provided to an analog-to-digital converter 430 which provides its digital outputs representative of the $CO_2$ and $O_2$ constituents of the output air of the chamber 412 to the data logging and analysis system 600.

The telemetry sub-system 500 is shown in schematic fashion in FIG. 11 and includes a battery-powered telemetry transmitter 502 implanted within the specimen S; a suitable transmitter for providing body temperature, heart rate, and ECG information is available from Data Science, Inc., St. Paul, Minn. under the Physiotel® TAIICTAF40 designation. A receiver 504 is mounted below the containment cell CC and includes one or more antennas (not shown) for receiving the radio-telemetered data from the transmitter 502; a suitable receiver 504 is available under the Physiotel® CTR86 designation from the above-named source. The output of the receiver 504 is provided to a data conditioner 506 which converts the received data to a digital format for the data logging and analysis system 600.

The data logging and analysis system 600, as shown in FIG. 1, includes a plurality of input ports $I_1$ through $I_n$ for accepting the data provided by the above-described sub-systems, a data storage section 602, and a processor section 604 that effect data processing as discussed below, and an output device 606 that provides the desired output information in graphical form, for example.

In one application of the above-described system, a plurality of same-sex mice of known genetic and behavioral characteristics where housed in respective containment cells CC and supplied with food, water, and breathing air as described above while data was logged from the various sub-systems described above. Variables directly measured or computed from source data included:

TABLE I

Total food consumption/day (g)
Food consumption ($g^{-1}$ LBM) (g)
Total water consumption/day (g)
Water consumption ($g^{-1}$ LBM) (g)
Average food consumption/episode (g)

Average water consumption/episode (g)
Consumption/episode (g)
Number feeding episodes/day
Number drinking episodes/day
Average time active/feeding episode (min)
Average time active/drinking episode (min)
Total time feeding/day (min)
Total time feeding/day (g$^{-1}$ food) (min)
Total time drinking/day (min)
Total time drinking/day (g$^{-1}$ water) (min)
Total food consumption/total water consumption $\times$ 100
Average body temp./day (group average) (°C)
Average body temp./hr (max-min) (24 h range, (°C)
Average activity/day (pulse/hr)
Average $CO_2$ consumption/day (g LBM) (m/g$^{-1}$hr$^{-1}$)
Average $CO_2$ consumption/day (g LBM) (m/g$^{-1}$hr$^{-1}$)
Average respiration quotient/day
Respiration quotient variation/day (max-min)

Sufficient data was obtained to demonstrate an equilibrium state for the specimens S, that is, a recurring physiological waveform including diurnal variations. Thereafter, food was withdrawn from the specimens S on alternate days to observe the physiological, metabolic, and behavioral responses of the specimens S consequent to alternate day caloric restriction. Among other effects, it was demonstrated that alternate day calorie-restriction results in a marked increase in life span, an increase in DNA repair, and a reduction in oncogene production.

In the context of the physiological and metabolic effects of pharmacologically active substances, such as toxins and carcinogens, the substances are administered to the specimens S after a baseline physiological waveform is obtained and the variations in that waveform determined. For example, the time-of-day of administration of the substance can be varied and the physiological and metabolic effects determined.

The present invention advantageously provides a method and apparatus for assessing metabolic and behavior physiology of living specimens by providing various life support materials and an input material of interest (i.e., a toxin, carcinogen, pharmacologically active compound) and sensing various data to assay the effect of the introduced input material to provide short- and long-term physiological waveforms that indicate specific pathological, physiologic, or behavioral effects of the select input material.

As will be apparent to those skilled in the art, various changes and modifications may be made to the illustrated method and apparatus for assessing metabolic and behavior physiology of animals of the present invention without departing from the spirit and scope of the invention as determined in the appended claims and their legal equivalent.

What is claimed is:

1. A containment system for containing a living specimen and for providing specimen-related data therefrom, said containment system comprising:
    a containment cell for containing a living specimen;
    a first weight sensing means connected to said containment cell for sensing the weight of said containment cell and any specimen therein and for providing an electrical signal output indicative of the weight of said containment cell and any specimen therein;
    means for dispensing at least one specimen-consumable substance to a specimen contained by said containment cell, said dispensing means mechanically decoupled from said containment cell;
    a second weight sensing means connected to said dispensing means for sensing the weight of said dispensing means and any specimen-consumable substances therein and for providing an electrical signal output indicative of the weight of said dispensing means and any specimen-consumable substances therein; and
    a signal processing for processing the electrical output signal of at least one of said first or second weight sensing means, said signal processing path including means for distinguishing an AC component of the signal output indicative of specimen activity and a DC component thereof.

2. The containment system of claim 1 wherein said dispensing means comprises:
    means for presenting food to a specimen contained by said containment cell, said food presenting means mechanically decoupled from said containment cell.

3. The containment system of claim 2, further comprising:
    means for presenting a drinkable liquid to a specimen contained by said containment cell, said liquid presenting means mechanically decoupled from said containment cell and said fool presenting means.

4. The containment system of claim 1, wherein said dispensing means comprises:
    means for presenting food to a specimen contained by said containment cell, said food presenting means mechanically decoupled from said containment cell; and
    means for presenting a drinkable liquid to a specimen contained by said containment cell, said liquid presenting means mechanically decoupled from said containment cell and said food presenting means.

5. The containment system of claim 2, 3, or 4, wherein at least one of said first and second weight sensing means comprise a load beam for providing an electrical output signal representative of the sensed weight and variations thereof.

6. The containment system of claim 1, wherein said signal processing path comprises a low-pass filter for distinguishing the AC component of the output signal.

7. The containment system of claim 6, wherein said low-pass filter has a cut-off frequency of about 10 Hz.

8. The containment system of claim 6, wherein said low-pass filter comprises an analog amplifier having a RC network at its input to pass frequencies below its cut-off frequency.

9. The containment system of claim 6, further comprising stored-program processor means for determining changes in the DC component of the output signal to indicate changes in the sensed weight.

10. The containment system of claim 9, wherein said stored-program processor means determines the activity episodes of the specimen from the AC component of the output signal.

11. The containment system of claim 1, further comprising:
    a radio telemetry transmitter implanted within the specimen contained within said containment cell for sensing at least one physiological characteristic of the so-contained specimen and transmitting a telemetry signal representative thereof.

12. The containment system of claim 11, further comprising a radio receiver for receiving the telemetry signal of said telemetry transmitter.

13. The containment system of claim 1, further comprising means for introducing a specimen-breathable gas of known constituents, the gas including oxygen.

14. The containment system of claim 13, further comprising means for analyzing at least the oxygen content of the gas after exhalation by the specimen.

15. The containment system of claim 13, further comprising means for analyzing at least the carbon dioxide and oxygen content of the gas after exhalation by the specimen.

16. A containment system for containing a living specimen and for providing specimen-related data therefrom, said containment system comprising:
a containment cell for containing a living specimen;
a first weight sensor connected to said containment cell for sensing the weight of said containment cell and any specimen therein and for providing an electrical signal output indicative of the weight of said containment cell and any specimen therein;
means for presenting food to a specimen contained by said containment cell, said food presenting means mechanically decoupled from said containment cell;
a second weight sensor connected to said food presenting means for sensing the weight of said food presenting means and any food therein and for providing an electrical signal output indicative of the weight of said food presenting means and any food therein;
means for presenting a drinkable liquid to a specimen contained by said containment cell, said liquid presenting means mechanically decoupled from said containment cell and said food presenting means;
a third weight sensor connected to said liquid presenting means for sensing the weight of said liquid presenting means and any liquid therein and for providing an electrical signal output indicative of the weight of said liquid presenting means and any liquid therein; and
a signal processing path for processing the electrical output signal of at least one of said first, second, or third weight sensing means, said signal processing path including means for distinguishing an AC component of the signal output indicative of specimen activity and a DC component thereof.

17. The containment system of claim 16, wherein each of said weight sensors comprise a load beam for providing an electrical output signal representative of the sensed weight and variations thereof.

18. The containment system of claim 16, wherein said signal processing path comprises a low-pass filter for distinguishing the AC component of the output signal.

19. The containment system of claim 18, wherein said low-pass filter has a cut-off frequency of about 10 Hz.

20. The containment system of claim 17, further comprising stored-program processor means for determining changes in the DC component of the output signal to indicate changes in the sensed weight.

21. The containment system of claim 20, wherein said stored-program processor means determines the activity episodes of the specimen from the AC component of the output signal.

22. The containment system of claim 16, wherein said food presenting means comprises:

means for containing a supply of solid food in discrete food units for consumption by the specimen and having an aperture therein for presenting successive food units to the specimen; and
a catch pan connected to said food containing means for receiving any food removed from said food containing means and not consumed by said specimen, whereby changes in the output signal of said second weight sensor are at least representative of the solid food consumed by the specimen.

23. A containment system for containing a plurality of living specimens and for providing specimen-related data therefrom, said containment system comprising:
a plurality of containment cells for containing respective living specimens;
a respective first weight sensor means connected to each of said containment cells for sensing the weight of its containment cell and any specimen therein and for providing an electrical signal output indicative of the weight of said containment cell and any specimen therein;
means associated with each containment cell for dispensing at least one specimen-consumable substance to the specimen contained by that containment cell, said dispensing means mechanically decoupled from its containment cell; and
a respective second weight sensor means connected to each dispersing means for sensing the weight of its dispensing means and any specimen-consumable substances therein and for providing an electrical signal output indicative of the weight of said dispensing means and ny specimen-consumable substances therein; and
a signal processing path for processing the electrical output signal of at least one of said respective first or second weight sensing means, said signal processing path including means for distinguishing an AC component of the signal output indicative of specimen activity and a DC component thereof.

24. The containment system of claim 23, further comprising stored-program processor means for determining changes in the output signal.

25. The containment system of claim 24, further comprising multiplexer means for multiplexing the signals to said stored-program processing means.

26. A solid food dispensing system, comprising:
means for containing a supply of solid food in discrete food units for consumption by a specimen and having an aperture therein for presenting successive food units to the specimen;
a catch means connected to said food containing means for receiving any food removed from said food containing means and not consumed by said specimen;
a load beam connected to said containing means for sensing the combined weight of said food containing means, any foods units therein, and any food received by said catch means and for providing an electrical output signal representative of the sensed weight and variations thereof; and
a signal processing path for processing the electrical output signal of said load beam, said signal processing path including means for distinguishing an AC component of the signal output indicative of specimen feeding activity and a DC component thereof.

27. The solid food dispensing system of claim 26, wherein said signal processing path comprising a low-pass filter for distinguishing the AC component of the output signal.

28. The solid food dispensing system of claim 27, wherein said low-pass filter has a cut-off frequency of about 10 Hz.

29. The solid food dispensing system of claim 26, further comprising stored-program processor means for determining changes in the DC component of the output signal to indicate changes in the sensed weight.

30. The solid food dispensing system of claim 29, wherein said stored-program processor means determines the feed-activity episodes of the specimen from the AC component of the output signal.

31. A method for determining at least one physiologic characteristic of a living specimen and the effect of a physiology-affecting stimuli thereon, comprising:
   containing a specimen within a containment cell;
   supplying the specimen with a plurality of specimen-consumable substances;
   measuring the quantity of at least one of the consumable substances consumed;
   continuously monitoring a plurality of physiologic parameters associated with the specimen over a selected period of time to determine a physiologic waveform therefor, said plurality of physiologic parameters including physical activity periods of the specimen over time;
   introducing a physiology-affecting stimuli to the specimen; and
   re-monitoring the plurality of physiologic parameters associated with the specimen over a selected period of time to determine a change in the physiologic waveform consequence to the physiology-affecting stimuli.

* * * * *